United States Patent [19]
Chay

[11] 3,888,790
[45] June 10, 1975

[54] PROCESS FOR PREPARING A CATALYTICALLY ACTIVE CERAMIC COATINGS

[75] Inventor: Dong Myung Chay, Wilmington, Del.

[73] Assignee: E. I. du Pont de Nemours & Company, Wilmington, Del.

[22] Filed: Sept. 20, 1973

[21] Appl. No.: 399,328

Related U.S. Application Data

[62] Division of Ser. No. 201,894, Nov. 24, 1971, Pat. No. 3,791,995.

[52] U.S. Cl. ................. 252/432; 427/245; 427/376
[51] Int. Cl. ........................ B32b 15/18; B44d 1/34
[58] Field of Search ...... 117/129, 119, 169; 106/48, 106/54, 39.6, 39.8; 126/19

[56] References Cited
UNITED STATES PATENTS

| | | | |
|---|---|---|---|
| 3,460,523 | 8/1969 | Stiles et al. | 126/19 |
| 3,509,041 | 4/1970 | Miale | 423/326 |
| 3,545,423 | 12/1970 | Morgan | 117/129 |
| 3,668,152 | 6/1972 | Lee | 106/48 |
| 3,761,293 | 9/1973 | Carini et al. | 106/48 |

FOREIGN PATENTS OR APPLICATIONS

1,197,067   7/1970   United Kingdom

*Primary Examiner*—William D. Martin
*Assistant Examiner*—Sadie L. Childs

[57] ABSTRACT

An article having a catalytic porcelain coating is prepared by a process comprising blending a ceramic, porous, catalytic fired composition containing 40–80 weight percent of in-situ formed braunite ($MnO \cdot 3Mn_2O_3 \cdot SiO_2$), 10–50 weight percent of an alkali-free amorphous binder phase composed of a borosilicate glass formed in situ, and 0–20 weight percent of a refractory crystalline phase with a porcelain enamel composition and water to form a slip, applying the slip to the article, drying the resulting coating, heating the coating at 1400°–1500°F., and cooling to room temperature. The process is useful for preparing catalytic surfaces in self-cleaning ovens and in emission control devices used for the oxidation of vapors.

4 Claims, No Drawings

PROCESS FOR PREPARING A CATALYTICALLY ACTIVE CERAMIC COATINGS

CROSS-REFERENCE TO RELATED APPLICATION

This application is a divisional of my copending application Ser. No. 201,894, filed Nov. 24, 1971 and now U.S. Pat. No. 3,791,995.

BACKGROUND OF THE INVENTION

This invention relates to novel, porous, ceramic, catalytic compositions suitable for use in self-cleaning ovens and in pollution control devices; to a method of preparing such compositions; and to articles containing such compositions.

Self-cleaning ovens are known in the art. They depend either on the catalytic oxidation of food spatter at their normal operating temperatures or on non-catalytic oxidation at a higher temperature especially required for the selfcleaning cycle. In the former type, the catalyst is incorporated into the surface coating of the oven walls, and the coating is made porous usually by underfiring, to increase the contact surface of food with oxygen, thus increasing the effectiveness of the oxidation. The catalyst usually is a metal oxide or a mixture of metal oxides. Typical metal oxides include manganese oxide, chromium oxide, cobalt oxide, nickel oxide, and rare earth oxides. Representative prior art includes U.S. Pat. Nos. 3,266,477; 3,460,523; 3,397,154; 3,545,423; 3,547,098; and 3,576,667; as well as French Pat. No. 1,594,174. None of the presently known oven catalyst coatings contain braunite.

The prior art suggests that the finer the frit particle, the better the coating as far as its activity to remove food spatter is concerned, provided it is sufficiently porous. On the other hand, the finer the frit particles the more difficult it is to control the firing temperature to obtain a porous, adherent coating. The resulting poor quality control is a major problem with present commercial frit coatings.

The present commercial coatings contain a metal oxide (usually manganese oxide) as the catalyst and an underfired porcelain enamel as the binder. These coatings often are soft, scratch easily, rub off readily, or must be applied in an uneconomical, difficult to control, two-step firing process. There is a need for strong, hard, porous catalytic material that can be bonded with a porcelain enamel to metal or ceramic surfaces using conventional enamel firing conditions to give a hard, adherent, porous, and catalytically active coating.

SUMMARY OF THE INVENTION

According to this invention, there is provided a porous catalytic fired composition suitable for use in self-cleaning ovens and in gaseous pollution control devices. This material consists essentially of 40–80 weight percent of braunite, 10–50 weight percent of an amorphous binder phase, and of 0–20 weight percent of a refractory, crystalline phase. The surface area of this material is about 0.2 m²/g, and its hardness is about 3–6 on the Moh's scale. The amorphous binder phase consists essentially of a mixture of reaction products of the oxides of boron and silicon where the weight ratio of $SiO_2:B_2O_3$ is between 1:1 and 15:1 and may also contain one or more oxides of magnesium, calcium, and aluminum. The refractory, crystalline phase consists of one or more oxides of magnesium, calcium, strontium, silicon, aluminum, titanium, zirconium, manganese, chromium, iron, cobalt, nickel, zinc and their crystalline reaction products with each other.

The above composition is conveniently prepared by blending proper amounts of manganese dioxide with the other metal oxides and firing the blend at a temperature of 1550–1800°F. (843°–982°C.) for about 5–20 minutes.

DETAILED DESCRIPTION OF THE INVENTION

The major catalytic component of the ceramic catalyst compositions of the present invention is braunite, which can be represented by the formula $MnO.3Mn_2O_3.SiO_2$. Braunite is known to have catalytic activity, see U.S. Pat. No. 3,509,041. Although braunite is a naturally occurring mineral, it is most practical to form it in situ during the preparation of the catalytic compositions of this invention. These ceramic catalyst compositions have a high porosity, which is retained in frit-bonded catalytic coatings because the catalytic coatings are usually applied at temperatures lower than the firing temperature range used in preparing the ceramic catalytic composition. The open structure of the fired catalytic composition is achieved by incorporating a refractory crystalline phase that does not vitrify under the processing conditions and by forming in situ an amorphous phase, preferably an alkali-free borosilicate glass, as a binder for the refractory phase and the braunite. When such porous particles are bonded together with a conventional porcelain enamel, strong and hard but porous coatings can be prepared.

The fired catalytic compositions containing braunite are in the form of hard clinkers whose color ranges from brown to black depending on the constituents. The hardness of the clinkers is related to the temperature of firing and the composition itself, and it ranges from 3 to 6 as determined on the Moh's scale according to the procedure described in Mineralogy: An Introduction to the Study of Minerals and Crystals, by E. H. Kraus, W. F. Hunt, and L. S. Ramsdell, 5th Edn., McGraw-Hill Book Co., Inc., New York, pp. 101–102, 1959.

The clinkers can be readily reduced into fine powder form by means of mechanical crushing, such as micropulverizing, or ball-milling. The resulting powder has a surface area ranging from 0.2 to 6 m²/g, as measured by nitrogen adsorption. The relatively high surface area is desired to achieve a coating of satisfactory quality. Too low a surface area does not impart a sufficiently high activity for removing food spatter, whereas too high a surface area causes cracking of the coatings during firing as a result of high shrinkage.

Braunite: The upper limit of the amount of braunite present in the ceramic catalyst of the invention is about 80 percent by weight. At higher concentrations, the amount of amorphous binder phase present is too small for effective bonding of braunite, resulting in a ceramic catalyst which is not sufficiently durable for many purposes. Even though ceramic coatings with concentrations of less than about 40 percent by weight of braunite can be prepared, and may have initial catalytic activity, they usually have insufficient capacity to maintain their activity over the long periods of time required for practical operations. It is preferred that the amount of braunite in the ceramic catalyst be in the range of 50 to 70 percent to obtain the best combination of activity and durability, particularly when bonded with 15 to 35 percent of the amorphous binder phase. Analysis of braunite in the catalyst is made by X-ray diffraction, using pure natural braunite as a standard for calibration.

Refractory Crystalline Phase: The ceramic catalyst of the invention also contains 0 to 20 percent of a refractory crystalline phase consisting of one or more oxides from the group of Mg, Ca, Sr, Si, Al, Ti, Zr, Mn, Cr, Fe, Co, Ni, Zn, and their reaction products with each other, which promote porosity in the catalyst. The oxides of Si, Al, Mn, and Co are preferred because they give the optimum combination of porosity and hardness. Amounts greater than about 20 percent by weight of the crystalline, refractory phase tend to make the compositions too soft and inhibit the formation of braunite. The ceramic catalyst may have no refractory crystalline phase, in which case the required porosity is derived entirely from the braunite. The preferred range of the refractory crystalline phase is 5 to 20 percent, with the preferred composition of the phase consisting of one or more oxides of silicon, aluminum, manganese, cobalt and their reaction products with each other. Such compositions have optimum porosity. This is particularly true when 50 to 70 percent by weight of braunite is present in the catalyst, which is bonded with 15 to 35 percent of an amorphous phase consisting of oxides of boron and silicon, and one or more oxides of magnesium, calcium, and aluminum. Such catalyst clinkers have a hardness of 3 to 5 on the Moh's scale. The surface area of the fine powder obtained by crushing such clinkers is in the range of from 0.2 to 5 m²/g, as measured by nitrogen adsorption.

The refractory crystalline phase is defined as that portion of the ceramic catalyst which is resistant to leaching by a mixture of 6 parts of 48 percent by weight HF and 0.2 parts of 70 percent by weight $HNO_3$ on treating at 150°C. for 4 hours in a closed Teflon vessel.

Amorphous Binder Phase: The ceramic catalyst of the invention contains 10 to 50 percent by weight of an amorphous binder phase consisting of reaction products of oxides of boron and silicon and one or more oxides of Mg, Ca, and Al. The amorphous binder phase actually is an alkali-free borosilicate glass which is formed in situ from the above oxides. In the absence of this phase, braunite does not form, and with less than 10 percent glass present the formation of braunite is too slow for all practical purposes. At a higher level than about 50 percent, the fired compositions of the invention lose their porosity. The most active catalysts with the best combination of braunite content and porosity contain 15 to 35 percent of amorphous phase consisting preferably of reaction products of oxides of boron and silicon, and one or more oxides of magnesium, calcium, and aluminum.

The amorphous binder phase is defined as that portion of the ceramic catalyst other than braunite which is leached by the acid treatment described in the preceding section. The amount of amorphous phase present in the catalytic composition of the invention is determined by substracting the amount of braunite present from the total fraction which is dissolved by acid leaching the ceramic catalyst, as described above.

The composition of the dissolved amorphous phase can be determined by atomic absorption spectroscopic analysis of the solution.

Formation of Braunite: The porous catalytic articles of the invention contain braunite which is formed in situ by firing the starting oxides. Typical x-ray diffraction line spacings and intensities obtained for the ceramic catalyst of the invention are given below in Table 1, and they are consistent with those expected for a mixture of braunite and other ceramic compounds. However, a mixture of manganese dioxide and silica in the stoichiometric ratio corresponding to braunite and which was fired at the temperatures specified in this invention, did not have an x-ray diffraction pattern corresponding to braunite. This demonstrates that the amorphous phase must be present during firing to facilitate the formation of braunite. Furthermore, it shows that the product of this invention is not a physical mixture of silica and manganese oxide.

TABLE I

"d"-Spacings of Braunite and of the Ceramic Catalyst of this Invention

| Braunite ($MnO.3Mn_2O_3.SiO_2$ FeKα Radiation with MnO Filter ASTM Index No. (1969): | | Corresponding Spacings for a Ceramic Catalyst Prepared by the Procedure of Example 1, below | | Corresponding Spacings for a Ceramic Catalyst Prepared by the Procedure of Example 3, below | |
|---|---|---|---|---|---|
| "d" A | I/I$_o$ | "d" A | I/I$_o$ | "d" A | I/I$_o$ |
| 2.72 | 100 | 2.70 | 100 | 2.6965 | 100 |
| 2.50 | 5 | 2.51 | 8 | 2.5048 | 4.3 |
| 2.41 | 5 | | | | |
| 2.35 | 40 | 2.34 | 10 | 2.3368 | 11.3 |
| 2.25 | 5 | | | | |
| 2.14 | 50 | 2.13 | 50 | 2.1311 | 10.7 |
| 1.870 | 20 | 1.86 | 6 | 1.8663 | 2.9 |
| 1.83 | 10 | | | | |
| 1.803 | 20 | | | | |
| 1.732 | 20 | 1.73 | 6 | | |
| 1.656 | 70 | 1.65 | 50 | 1.6477 | 23.8 |
| 1.533 | 20 | 1.53 | 3 | | |
| 1.499 | 10 | 1.48 | 4 | | |
| 1.466 | 10 | | | | |
| 1.420 | 40 | | | | |
| 1.407 | 30 | 1.41 | 18 | | |

NOTE: Use of CuKα instead of FeKα of ASTM Index will cause some change in "d" spacing and intensity.

Coatings Prepared from Ceramic Catalyst: The porous ceramic catalyst of the invention described above is used with porcelain enamel binders to prepare coatings on cooking surfaces which clean themselves of food spatters by catalytic action while cooking. Ordinarily, when food is spilled on an impervious surface of porcelain enamel of ovens and heated, unsightly food stains from which adhere firmly to the oven surfaces, and which are difficult to remove even by scouring or scrubbing. However, when food is spilled on the coatings prepared from the compositions of the invention, the stains are removed while the food is being cooked.

The coating contains about 30 to 70 percent by weight of braunite, 20 to 60 percent of an amorphous phase, and 0 to 25 percent of refractory crystalline phase. The dark-colored coating has a hard surface which is resistant to abrasion and chipping. Since it is also porous, it adsorbs food stains readily and removes them efficiently on heating. The porosity is determined by nitrogen adsorption on a sample of the coating which is obtained by scraping the coating with a blade of tungsten carbide. The upper limit for the surface area of the coating is about 3 m²/g, and it is obtained from the ceramic catalyst of the invention with a maximum surface area of about 5–6 m²/g. The lower limit is about 0.2 m²/g. The surface of the coating is smooth and has a mat finish. The hardness of the coating of the invention varies between 20 and 50 mils, as measured under a load of 1000 gm using a "Modified Hoffman Scratch Hardness Tester", SG-1610-M, Gardner Laboratory, Inc., Bethesda, Maryland.

Porcelain Enamel Binder: The porcelain enamels used as binders for preparing catalytic coatings consist of mixtures of metal oxides which can be obtained commercially in batch form, or which can be formulated using commercially available frits. The porcelain enamel binder should be compatible with the ceramic catalyst in the sense that on firing and cooling the coating does not crack due to differential thermal expansion. The amount of binder in the coating varies from the lower limit of about 15 percent to the upper limit of about 30 percent by weight, depending on the composition of the ceramic catalyst. When the binder is present in amounts less than about 15 percent, the catalytic coating is too soft and is abraded off readily. Therefore, it is preferred that 20 to 25 percent of the binder be present to impart high hardness and good bonding to the porous catalytic particles. However, at binder levels greater than about 30 percent, the activity is decreased because the binder seals the pores of the ceramic catalyst.

The Process: The porous catalytic fired compositions of this invention are prepared by firing the mixtures of metal oxides described below.

The particles of these oxides should be less than about 200 U.S. Standard mesh, (74 microns) except boric oxide, which should be less than about 100 U.S. Standard mesh (149 microns). If the particles are too coarse, they do not mix intimately, and it may require a longer time at a given temperature of firing for the reaction to occur to form braunite and the amorphous binder phase. The long reaction time is undesirable because of undesirable grain growth. The metal oxide compositions are mixed together using conventional mixing equipment to obtain a uniform mixture. The mixing can be accomplished conveniently by ballmilling in water. Proper amounts of ingredients selected from the group of the oxides of manganese, boron, calcium, silicon, aluminum, cobalt, titanium, strontium, chromium, magnesium, zirconium, iron, nickel, and zinc, are placed in a porcelain ball mill containing alumina grinding inserts, about half full, and sufficient water is added to give a fluid slurry. The solids charged to the ball mill consist of 40 to 80 percent by weight of manganese dioxide, 10 to 30 percent of silicon dioxide, 2 to 10 percent of boric oxide, 5 to 15 percent of magnesium oxide and/or calcium oxide, and 0 to 20 percent of one or more oxides of Sr, Al, Ti, Zr, Cr, Fe, Co, Ni and Zn. In order to prepare catalysts of high porosity with the best combination of activity and durability, the solids charged to the ball mill consist of 50 to 70 percent manganese dioxide, 10 to 20 percent $SiO_2$, 4 to 8 percent boric oxide, 5 to 10 percent calcium oxide, and 5 to 15 percent aluminum oxide.

The total amount of the slurry charged should be just enough to fill the empty spaces between the grinding inserts. For a one-gallon ballmill, this is equivalent to approximately 1000 grams of solids. The mill is then tumbled on rollers, thereby mixing the individual ingredients intimately. It is not necessary normally to mill more than a few hours for this mixing. For a ballmill of one gallon size, only about 3 to 4 hours are required. The slurry is discharged from the mill and dried at approximately 125°C. in air to a soft cake.

The dried cake is screened through a fairly coarse screen, for example 40–70 U.S. Standard mesh (420–210 microns) to subdivide the cake for easier handling. The composition is then fired in a furnace in a container that will not react with it. To ensure the uniform firing of the composition in a relatively short time, it should be spread in an approximately 1 inch thick bed in the container. The firing can be accomplished conveniently by placing the powder in an Inconel tray and inserting it in an electric furnace which is at the desired firing temperature. After the tray has been inserted into the furnace, the furnace temperature drops substantially, requiring some time to increase to the desired level. The time required for the composition to attain the maximum temperature should not be unusually long, and it is normally no more than about 45 minutes after insertion of the powder into the furnace.

The powder can be fired at temperatures as low as 1550°F., and as high as about 1800°F. for a period of about 5 to 20 minutes. At temperatures lower than 1550°F., the formation of braunite is too slow, whereas at about 1800°F., the formation of braunite is almost complete in about 10 minutes, and heating for longer times or at higher temperature results in excessive grain growth, which is undesirable. After the firing is completed, the powder is removed from the furnace and allowed to cool in air. The fired composition is in granular or clinker form, usually has a very dark color, and is hard as well as porous.

The clinker is then subdivided into powder by means of a micropulverizer or by ballmilling. The micropulverized powder may contain a small amount of particles greater than 200 U.S. standard mesh (74 microns), which are undesirable; whereas by ballmilling, substantially all the particles will pass through 200 mesh. The wet ballmilling of the clinkers should be completed in less than about 24 hours, since longer milling tends to contaminate the powder and produce undesirably fine material. The slurry is then discharged from the mill and dried at about 125°C. in air, resulting in a powder of dark color. This powder is a suitable form of porous ceramic catalyst for use in coatings. The powder grains are tiny, hard, porous, sintered aggregates.

Preparation of Ceramic Catalyst Slip: To prepare a ceramic catalyst coating, measured quantities of the porous ceramic catalyst of the invention and the binder porcelain enamel are mixed together with water to prepare a slip. The mixing can be accomplished either by ballmilling or blending. The binder may be added as a slip, followed by ballmilling or blending. However, if the individual porcelain enamel binder components are mixed with the ceramic catalyst, ballmilling is necessary, since the flakes of frit must be reduced to fine powder of less than 200 U.S. standard mesh (74 microns).

Formulating a porcelain enamel composition possessing the desired firing temperature is well known in the art, and a book "Porcelain Enameling Operations," by E. E. Bryant, Enamelist Publishing Co., 4150 E. 56th. St., Cleveland, Ohio, p. 85–88, 1958, describes the test methods for comparing qualities of different porcelain enamel formulations. A porcelain enamel binder composition with a firing range of 1350°to 1500°F., preferably with 1400 °to 1500°F., is first prepared by ballmilling, and the resulting enamel slip containing about 60 percent by weight of solids should be essentially free of particles greater than 200 mesh. The slip is then mixed with the ceramic catalyst powder of the invention in the proportions of 70 to 85 percent ceramic catalyst and 15 to 30 percent porcelain enamel, by blending for a short time, usually about 10 minutes, using a Waring Blendor, its specific gravity being adjusted to between 1.58 and 1.62 by adding water and its consistency measured using an Irwin slump tester.

The Irwin slump tester consists of a brass cylinder 2.562 inches long × 2.468 inches outside diameter × 1.875 inches inside diameter and a large flat plate. The slip, the consistency of which is to be determined, is placed in the cylinder which is in the center of the plate. The cylinder, filled with the slip, is then instantly lifted, allowing the slip to flow freely over the plate. The diameter over which the slip spreads is used as an indication of how fluid or consistent the slip is.

The slip thus prepared is applied on a metal plate, which is dried and fired at elevated temperatures to obtain hard and porous catalytic coatings. The slip can be applied by spraying, or by dipping a plate into it. For spraying, the optimum specific gravity and the slump of the slip depend partly on the types of ceramic catalyst and binder compositions. However, they usually are about 1.6 and 9 inches in diameter, respectively. If a slip has a high slump, i.e., is too thin, then it runs on the plate after spraying; whereas when the slump is too low, i.e., the slip is too thick, it is difficult to control the thickness of the coating applied, and a smooth coating is not readily obtained.

An alternative means for preparing a ceramic catalyst slip with a binder is to ballmill the clinker of the prefired ceramic catalyst composition of the invention or the ceramic catalyst powder with the porcelain enamel binder constituents all together. The slip prepared in this manner should also have properties similar to those described previously.

PREPARATION OF METAL SUBSTRATES FOR APPLICATION OF THE CERAMIC CATALYST SLIPS

The ceramic catalyst slip as prepared above is applied to the surface of metal or ceramic substrates. Enameling steels are preferred, but nonferrous metals may also be used as substrates for the ceramic catalyst coating; however, they should have oxidation resistance, thermal expansion coefficients, and wetting characteristics similar to the enameling steels. The slips can also be applied to a porcelain enamel coating which has previously been fused onto the metal. Such a ground coat should have a higher firing temperature than the top catalytic coating of ceramic catalyst. If the ground coat has a lower firing temperature than the top coating, then it causes blinding of the pores and cracking of the top coating. To impart good wetting and adhesion of the porcelain enamel, the surface must be cleaned free of rust, grease, and other foreign contamination before the slips are applied. There are numerous ways of preparing enameling steel surfaces, such as sand blasting and chemical methods of cleaning. Detailed cleaning procedures are described in the book "Porcelain Enamels," by Andrew I. Andrews, The Garrard Press, Champagne, Ill., 2nd Edn., Chapter 5, 1961.

Preparation of the Ceramic Catalyst Coating: The ceramic slip is prepared and applied to the substrate as described above, and is then dried and fired at elevated temperatures to obtain hard and porous catalytic coatings.

The catalyst slip prepared as previously described is applied on the substrate in thin layers to give finished coatings of about 3 to 5 mils in thickness. The wet coating on the plate is then dried immediately to a bisque coating at temperatures less than about 400°F. A detailed description of the application of a slip and the drying operation is described in "Porcelain Enamels," by A. I. Andrews, The Garrard Press, Champagne, Ill., 2nd. Edn., pp. 393–401, 404–406, 1961. Upon application of the slip, the wet coating should be dried immediately, since the wet slip can cause rusting of the steel, which results in poor adhesion of the coating. Drying at temperatures higher than about 400°F. is not necessary, and in many cases may be undesirable because too rapid evaporation of water in the slip can cause cracks or bubbles in the coating. The dried bisque is then fired at elevated temperature for a short time such as 3 to 5 minutes at its optimum firing temperature.

The optimum firing temperature of a coating depends on the composition. The firing temperature of conventional porcelain enamels is greater than 1300°F., usually greater than 1400°F., and less than about 1600°F. Therefore, the temperature at which a ceramic catalyst coating is fired depends on the firing temperature of the porcelain enamel binder. Since the firing temperature of conventional porcelain enamels is about 1300°F. or greater, it is desirable to fire the catalytic coating at these temperatures also. The firing temperature for the porcelain enamel to be used as a binder for the coating of the invention should be between about 1350°F. and 1500°F. Therefore, when a porcelain enamel with an optimum firing temperature of 1400°F. is used as a binder, the coating should also be fired at this temperature. However, such a coating can also be fired at 1500°F, or higher, without sacrificing the properties of the coating materially. Similarly, a coating containing a porcelain enamel with an optimum firing temperature of 1500°F. can be fired at 1600°F., or higher, as well as 1500°F. The dried bisque coatings are then fired at 1400° to 1550°F. and preferably at 1400° to 1500°F. for 3 to 5 minutes.

Prior art catalyst coatings have had a very limited firing range, typically 30° to 50°F., because the porosity of the coatings is achieved mainly during the firing cycle by keeping the temperature just below the fusion temperature. Therefore, the best combination of both porosity and hardness of the coating could be obtained only within a narrow temperature range. Thus, if these prior art coatings were underfired, they were too soft due to lack of bonding between the particles; and if overfired, they were inactive for self-removal of food soils as a result of their low porosity. The prior art process is very difficult to control, and commercial coatings have shown wide variability and lack of reproducibility in properties.

The coatings of this invention, prepared by bonding together the porous and hard particles of catalytically active ceramics, have high porosity, and the surface area is in the range of 0.2 to 3 $m^2/g$ by nitrogen adsorption. The structure of the coating can be well seen in the drawing. Since the porosity of the coatings is derived from the porosity of the catalytic ceramic particles themselves, the porosity and hardness of the coatings are relatively insensitive to overfiring or underfiring of the lower melting binder phase. Thus, the compositions of this invention, in which the catalytically active ceramic phase is combined with a porcelain enamel, have a broad firing range of about 100° to 150°F.

The dried bisque of the ceramic catalyst coating is inserted into a furnace which is set at the firing temperature. After insertion of the coated article, the temperature of the furnace usually drops substantially below the original set temperature, requiring several minutes for the furnace to recover the original temperature. The time required for the furnace to recover the optinum temperature should not be more than about 5 minutes. In the case of firing in a tunnel kiln, the time required for the coating to reach the maximum temperature should be about 5 minutes. After the furnace has recovered the optimum firing temperature, the coating is heated for 3 to 5 minutes; the hot article is immediately removed from the furnace and placed in another furnace, which is maintained at about 750°F. For some coating compositions, the latter step is not required. However, for others it is necessary because sudden cooling in the air causes cracking and crazing of the coating due to the differential thermal expansion of the coating and the metal substrate.

The compositions prepared in this manner contain 30 to 70 percent, preferably 40 to 55 percent, braunite; 20 to 60 percent, preferably 30 to 60 percent, of an amorphous phase; and 0 to 25 percent, preferably 2 to 15 percent, of a refractory crystalline phase consisting of one or more oxides of Mg, Ca, Sr, Si, Al, Ti, Zr, Cr, Mn, Fe, Co, Ni, Zn and their reaction products with each other. The surface area of the coating measured by nitrogen adsorption ranges from 0.2 to 3 m²/g, depending on the composition, the firing temperature and time; and its hardness ranges from 20 to 50 mils, preferably 25 to 40 mils, by the Modified Hoffman scratch test at 1000 g load.

The coatings are dark in color, hard, smooth, with no cracks, and have an appealing mat texture. Such a coating on the interior surfaces of an over cleans itself of food spatters efficiently by catalytic action. The efficiency of the coating is measured by the thermogravimetric method, in which the loss of weight of pork fat at 450°F. is determined as a function of time elapsed. In this test, the coating on a test panel is first conditioned by heating in an ordinary domestic oven for about 16 hours at 450°F. prior to the application of the fat. An analytical balance is mounted over the oven, and the coated test panel can be weighed by hanging it on a chain extending down from the balance through a hole in the top of the oven. The panel remains in a horizontal position in the oven for the duration of the test, except when being weighed. After the conditioning period, the 4 inch × 4 inch test plate is tared and the molten fat applied. The application is done with an applicator consisting of an array of 47 steel pins, 1/16 inch in diameter, located on ½ inch centers. The ends of the pins are dipped into a bath of ordinary molten pork fat, at about 40°–50°F., then placed in contact with the coating, thus depositing on the coating droplets of the fat weighing a total of about 100 to 110 milligrams. The coating is then weighed at regular time intervals during heating at 450°F. The rate of weight loss and the final weight is a measure of the effectiveness of the coating in removing pork fat stains.

The compositions of this invention are also useful as oxidation catalysts in devices for the catalytic oxidation of undesirable gaseous effluents to eliminate or minimize atmospheric pollution. Such devices are useful, for example, in controlling automobile exhaust fumes and the emissions from industrial processes duch as paint drying, cooking, and burner chimneys or stacks.

The catalytic coatings of this invention are effective from about 350°F. to the temperature at which further sintering will occur. This upper temperature range depends on the coating composition but will normally be above 1000°F.

This invention is now illustrated by the following examples of certain preferred embodiments thereof, wherein all parts, proportions, and percentages are by weight unless otherwise indicated. All mesh sizes are U.S. Standard mesh.

EXAMPLE 1

A ballmill of 1-gal capacity is about half filled with 6426 g of ½ inch dia. × ½ inch high cylindrical alumina grinding inserts. The following amounts of oxide powders are added to the mill:

|  | Amt. (g) | % |
|---|---|---|
| manganese oxide[a] | 585.0 | 58.5 |
| cobalt oxide[b] | 65.0 | 6.5 |
| boric oxide[c] | 60.0 | 6.0 |
| calcium oxide[d] | 52.5 | 5.25 |
| silica[e] | 167.5 | 16.75 |
| alumina[f] | 70.0 | 7.0 |
|  | 1000.0 g | 100.0% |

(a) Manganese Type "SM", Chemetals Division, Diamond Shamrock Chemicals Co., particle size less than 325 mesh (nominally, manganese dioxide)
(b) Calcination product of technical cobalt carbonate from Shepherd Chemical Co., particle size less than 325 mesh
(c) Boric anhydride, reagent grade, particle size less than 100 mesh
(d) Reagent Grade, particle size less than 200 mesh
(e) Amorphous silica, particle size less than 325 mesh, Glass Rock Products, Inc.
(f) XA-16 Grade, Alcoa, particle size less than 200 mesh The anhydrous $B_2O_3$ is first slurried with 457 g of distilled water and the mixture is permitted to cool to room temperature before ball milling. Seven hundred ninety three grams of distilled water are added and the ball mill is then tumbled on rollers at 70 revolutions per minute for 3½ hours. The thoroughly mixed slurry is removed from the mill and dried in air at 120°C., thereby recovering 530 g of soft cake, which is black in color.

The cake is broken up into powder by screening through a 100-mesh sieve, 446 g of which is placed, in about equal amounts, on each of four Inconel trays about 8½ inches long × 3½ inches wide and 1 inch deep. The trays are inserted in an electric furnace, Thermolyne, Model F-A1730, Sybron Corp., at 1700°F, upon which the furnace cools to about 1160°F within a period of about 1 minute. The firing of the powder is monitored by means of a chromel-alumel thermocouple embedded in the powder on one of the trays. The temperature of the powder is raised to 1700°F in 2 minutes, and the powder is held at 1700°F for 10 minutes, whereupon the trays are removed from the furnace, and the material is cooled in air, recovering 403 g of black porous clinkers, designated as Ceramic Catalyst Clinker. These clinkers are relatively hard, having a Moh's hardness of about 4. The relative Moh's hardnesses of various materials are given in Mineralogy, an introduction to the study of minerals and crystals, by E. H. Kraus, W. F. Hunt, and L. S. Ramsdell, Fifth Edition, McGraw-Hill Book Co., Inc., New York, pp. 101–102, 1959. The catalyst clinker contains 57.2 percent of braunite ($MnO.3Mn_2O_3.SiO_2$), as determined by X-ray analysis using pure natural braunite as a reference, 7.3 percent refractory crystalline phase and 35.5 percent amorphous binder phase, determined by acid leaching, as described previously.

The porous clinkers are then crushed and reduced to powder by ballmilling. Three hundred eighty-two (382) grams of the clinkers and 535 g of distilled water are placed in a ½-gallon porcelain ballmill containing 2028 g of $Al_2O_3$ grinding inserts (about half full). The mill is rolled continuously for 24 hours at about 90 rpm, whereupon the slurry in the mill is removed and dried in air at 120°C, recovering 370 g of soft, black powder that has a surface area of 5.1 $m^2/g$ by nitrogen adsorption analysis. The powder is designated as ceramic catalyst.

To make a hard, porous and thin coating useful as a self-cleaning surface for cooking devices, the ceramic catalyst is mixed with a binder, which is applied on a steel substrate and fired. One hundred fifteen grams of the catalyst, 188 g of distilled water, and 56 g of a porcelain enamel slip containing 61 percent solids are placed in a ½-gallon porcelain ballmill containing alumina grinding inserts about half full, and the mill is tumbled on rollers for 3 hours, thereby preparing a slip containing 23 percent porcelain enamel that has only a trace amount of material that does not pass through a 200-mesh sieve.

The porcelain enamel slip described above has a firing range of 1370°–1400°F. It is prepared from the following compositions:

| | |
|---|---|
| Frit No. 2244 (Ferro Co.) | 200 g |
| Frit No. 2254 (Ferro Co.) | 400 g |
| Frit No. 2255 (Ferro Co.) | 400 g |
| Red Label Clay (Ferro Co.) | 40 g |
| No. 33 Clay (Ferro Co.) | 30 g |
| Bentonite | 1.25 g |
| Borax | 1.25 g |
| Quartz (National Glass Sand Co.) | 100 g |
| XA-16 Alumina (Alcoa Co.) | 250 g |
| No. 8821 Black Oxide (Shepherd Co.) | 20 g |
| Water | 1000 g |

The frits are first micropulverized to −60 mesh powders, which are then placed in a one gallon ballmill about half filled with alumina grinding cylinders of about ½ inch dia. × ½ inch high. The remainder of the components and water are then added. The mill is then tumbled at 80 rpm for 20 hours, upon which the slip is recovered. The slip has a solids content of 59 percent.

The firing range of porcelain enamel is defined here as the range of temperatures at which the bisque-dried layer of porcelain enamel, 1–3 mil thick, may be fired on metal plates for 3 minutes to give a hard, smooth coating that is free of pinholes due to overfiring, the surface of which does not have a dull finish and/or exaggerated orange-peel appearance due to underfiring.

The ballmilled slip of ceramic catalyst containing the porcelain enamel as the binder is applied by spraying on one side of a 20-gauge enameling steel plate, 4 inches × 4 inches in size. The plate is previously cleaned by sand-blasting, washing the surface, and rinsing it immediately with acetone and drying it in air. Approximately 4 g of the slip is sprayed in approximately uniform thickness on the plate, which is positioned vertically, using an aerosol type spray nozzle, JET-PAK, Sprayon Products, Inc. The wet coating is then dried immediately at 120°C in air, and fired in an electric muffle furnace with a 4 inch × 5 inch × 6 inch cavity.

The furnace is first brought to a temperature of 1500°F, and the plate is quickly inserted, allowing a minimum heat loss. The temperature of the furnace drops to about 1375°F, requiring about 80 seconds for the furnace to return to 1500°F. The coating is heated at this temperature for 3 minutes, and then removed to another furnace which is at about 750°F. After approximately 5 minutes in the second furnace, the plate is removed and cooled to room temperature.

The coating thus prepared has a surface that is smooth and mat textured. It is free of cracks and has a hardness of 30–35 mils by the modified Hoffman scratch test. The coating is about 3 mils thick, and is also porous, as demonstrated by its high capacity to absorb water. A sample of powder carefully scraped from the coating using a hard cobalt-tungsten carbide blade has a surface area of 1.7 $m^2/g$, as measured by nitrogen adsorption analysis. Analysis of this powder by X-ray diffraction and acid leaching as described previously shows 44.5 percent braunite, 10.3 percent refractory crystalline phase, and 45.2 percent amorphous phase.

The porous coating prepared in this manner is catalytically active in removing pork fat, as determined by the thermogravimetric method. The catalytic coating on a steel panel 4 inches × 4 inches is preheated in air at 450°F for 16 hours, when no further loss in weight is observed. The self-cleaning efficiency of the fat applied is measured in terms of the amount of residue remaining at the end of a 24 hour heating period, based on the total amount of fat applied, as follows:

A total of 104 mg of warm molten pork fat (45°F) is applied on a pre-tared panel by means of an applicator consisting of an orthogonal matrix of 47 steel pins which are 1/16 inch in diameter and the center of each pin is located ½ inch away from the center of the 4 nearest surrounding pins. The applicator is dipped in the fat and placed on the coating at about 400°F., thereby transferring drops of fat to the coating. The panel is then heated at 450°F. for 24 hours in a domestic oven. At the end of the continuous heating, the panel is weighed and found to have gained weight due to the unremoved residual fat, that corresponds to 13.5 percent of the total weight of fat applied. The appearance of the coating remains the same as before the test. In contrast, ordinary porcelain enamel subjected to a similar test has about 25 percent fat residue after heating, and its surface is badly soiled with "varnish" from fat decomposition products.

EXAMPLE 2

This example describes the preparation of a catalytic coating on a porcelain enamel substrate. A slip is prepared by mixing 37.7 g of the ceramic catalyst powder of Example 1 with 49 g of distilled water and 19.2 g of the porcelain enamel slip described in Example 1, in a 100 ml polyethylene blending container (No. 8486, Eberbach Corp.), using a Waring Blendor. The resulting slip contains 23 percent porcelain enamel as a binder. After blending for 10 min at "high speed", the slip is sprayed in the manner described in Example 1 on the porcelain enamel coat prepared as below.

A porcelain enamel coat with a firing range of 1550°–1600°F is prepared by ballmilling from a ground coat slip consisting of the following components:

| | |
|---|---|
| Frit No. 2244 (Fero Co.) | 800.0 g |
| Frit No. 2254 (Ferro Co.) | 200.0 g |
| Red Label Clay (Ferro Co.) | 40.0 g |
| No. 33 Clay (Ferro Co.) | 30.0 g |
| Quartz (National Glass Sand Co.) | 100.0 g |
| XA-16 $Al_2O_3$ (Alcoa Co.) | 250.0 g |
| No. 8821 Black Oxide (Sheperd Co.) | 20.0 g |
| Bentonite | 1.25 g |
| Borax | 1.25 g |
| Water | 800.0 g |

The frits are micropulverized to −40 mesh powder, which is then placed into a one gallon ballmill about half full of alumina grinding cylinders, about ½ inch dia. × ½ inch high. The remainder of the components are added, water being the last. The mill is tumbled for 4½ hours on rollers, thus preparing a slip that has only a trace amount of +200 mesh particles in a 50 gram sample. To 1067 g of the slip is added 105 g of water, resulting in a slip with a specific gravity of 1.60 and an Irwin slump of 11.5 inch.

Enameling steel plate, 4 inch × 4 inch in size, is dipped in the slip and the wet coating is dried at 110°C. The bisque coat is then fired at 1600°F for 3 min, obtaining a coating having a mat surface that is hard and free of defects.

The slip containing the ceramic catalyst is sprayed on the enamel substrate, dried at 120°C, and the bisque is then fired at 1475°F for 3 min, in a manner similar to the firing at 1500°F described in Example 1. The coating is free of cracks, and has a surface that is smooth and flat-textured. It is about 2 mils thick and has a hardness of 35 mils by the modified Hoffman scratch test. The coating has a surface area of 1.7 m²/g by nitrogen adsorption analysis.

As in Example 1, to determine the activity of the coating 98 mg of pork fat is applied and the coating is heated. The result shows that a residue of 15.3 percent based on the total amount of fat applied remained on the coating. The appearance of the coating remains the same as before the test.

EXAMPLE 3

A batch of ceramic catalyst clinker is prepared as in Example 1, except that the composition is fired in a ceramic crucible at 1800°F for 10 minutes. A clay crucible of about 4 inches dia. × 6 inches high (Fisher, melting fire clay crucible, 8-145D) containing 500 g of the mixture of the metal oxides of Example 1 is placed in the furnace at 1800°F, upon which the furnace cools to about 1300°F. The temperature is then increased slowly to 1800°F in a period of about 30 minutes. After the powder is fired for 10 minutes at this temperature, it is removed from the furnace and permitted to cool, thereby recovering a porous ceramic catalyst clinker that has a Moh's hardness of about 5. Analysis shows that the catalyst clinker contains 56.8 percent braunite, 6.5 percent refractory crystalline phase, and 36.7 percent amorphous binder phase. X-ray diffraction results on the clinker are given in Table 2, below, and the lattice constants obtained from it are: $a = 9.375$, $c = 18.55$, agreeing well with those of braunite, $a = 9.38$, $c = 18.67$.

TABLE 2

Diffraction Pattern of Ceramic Catalyst Clinkers of the Invention (CuKα with Ni Filter)

| "d" A | I/I$_o$ |
|---|---|
| 5.4195 | 3.1 |
| 5.3706 | 5.2 |
| 3.4700 | 11.2 |
| 2.6965 | 100.0 |
| 2.6676 | 16.3 |
| 2.5048 | 4.3 |
| 2.4927 | 5.4 |
| 2.4800 | 4.4 |
| 2.3368 | 11.3 |
| 2.3154 | 9.0 |
| 2.1398 | 6.6 |
| 2.1311 | 10.7 |
| 2.1249 | 10.8 |
| 2.0465 | 5.1 |
| 2.0417 | 5.4 |
| 1.8663 | 2.9 |
| 1.6609 | 4.7 |
| 1.6576 | 7.0 |
| 1.6521 | 17.0 |
| 1.6477 | 23.8 |
| 1.6393 | 11.8 |

The clinkers are then crushed to pass through a 200-mesh sieve, by ballmilling, as described in Example 1. The ceramic catalyst prepared as above has a surface area of 2.8 m²/g.

The catalyst is then mixed with the porcelain enamel described in Example 1, that has a firing range between 1370° and 1400°F, in a blender, as in Example 2, resulting in a slip that has a specific gravity of 1.6, containing 23 percent porcelain enamel as a binder. This slip is then applied on a clean enameling steel plate, 4 inches × 4 inches in size, and is fired in a manner similar to that described in Example 1, except that it is fired at 1430°F for 3 minutes. The surface of the coating prepared accordingly is smooth and crack-free. The coating is 3 mils thick and has a Hoffman scratch hardness of 35 mils. It has a surface area of 1.5 m²/g and consists of 44.2 percent braunite, 10.5 percent refractory crystalline phase, and 45.3 percent amorphous phase.

The pork fat removal efficiency of the coating is high, the residue being 15.9 percent of 113 mg of fat applied in the thermogravimetric activity test. The appearance of the coating is not affected by the test.

EXAMPLE 4

The slip from Example 3 is sprayed as in Example 1, on a clean enameling steel panel, 4 inches × 4 inches, dried and fired in the manner described in Example 3, except that the firing temperature is 1560°F. Such a coating is free of cracks, and is about 3 mils in thickness. It has a Hoffman scratch hardness of 30 mils, and a surface area of 2.0 m²/g and consists of 44.0 percent braunite, 9.8 percent refractory crystalline phase, and 46.2 percent amorphous phase. The pork fat residue as measured by the thermogravimetric method is 22.7 percent based on the 101 mg of total fat applied. No stains are visible on the coating after the test.

EXAMPLE 5

The ceramic catalyst of Example 3 is mixed with the slip of porcelain enamel described in Example 1, with a firing range between 1370° and 1400°F in a blender, as in Example 2, resulting in a slip containing 18 percent binder, the specific gravity of the slip being 1.6. A coating is prepared from the slip in the same manner described in Example 1, except that it is fired at 1475°F for 3 minutes.

Such a coating is about 3 mils in thickness, smooth, and has a hardness of 45 mils by the Hoffman scratch test. The result of the thermogravimetric test shows 19.3 percent of 171 mg pork fat applied remains as a residue after heating for 24 hours at 450°F and the appearance of the coating is unaffected by the test. The surface area of the coating is 1.2 m²/g by nitrogen adsorption.

EXAMPLE 6

A ballmill of ½-gallon capacity is about half filled with 2000 g of ½ inch dia. × ½ inch high cylindrical alumina grinding inserts. The following amounts of oxide powders are added to the mill:

|  | Amt. (g) | % |
| --- | --- | --- |
| manganese oxide | 234 | 58.5 |
| cobalt oxide | 26 | 6.5 |
| silica | 67 | 16.75 |
| magnesium oxide | 21 | 5.25 |
| boron oxide | 24 | 6.0 |
| alumina | 28 | 7.0 |
| Total | 400.0 | 100.0 |

The oxides are the same grade described in Example 1, except the $SiO_2$, which is quartz (96 percent particle size less than 325 mesh, No. 325, National Glass Sand Co.), and the MgO is a reagent grade, the particle size being less than 200 mesh. The anhydrous $B_2O_3$ is slurried first with 300 g of distilled water, which is then permitted to cool to room temperature before mixing. To the mill is added 300 g of distilled water, and the mill is tumbled on rollers at 90 rpm for 3 hours. The slurry is removed from the mill and dried in air at 120°C., thereby recovering 362 g of soft cake, which is black in color. The cake is screened through a 40-mesh sieve and 150 g is placed on two Inconel trays and fired, in the manner described in Example 1, except that the maximum temperature is 1800°F. Upon insertion of the trays, the furnace cools to 1200°F; however, the initial temperature of 1800°F is recovered in 16 minutes. After 10 minutes at 1800°F, the powder is removed from the furnace and is permitted to cool in air, recovering 133 g of black, porous ceramic catalyst clinker having a Moh's hardness of about 3. Analysis shows that the catalyst clinker contains 55.9 percent braunite, 11.3 percent refractory crystalline phase, and 32.8 percent amorphous binder phase.

One hundred thirty grams of the catalyst clinker is then tumbled with 250 g of water and 1000 g of $Al_2O_3$ inserts in a ½-gallon size porcelain ballmill for 16 hours, the slurry being dried at 125°C in air. The ceramic catalyst as prepared above has a surface area of 5.0 m²/g.

The catalyst, in the amount of 38.5 g, is then mixed by blending as in Example 2 with the proper amount of porcelain enamel binder as described in Example 1, to prepare a slip containing 23 percent binder. The slip is then sprayed on a 20-gauge plate of 4 inch × 4 inch enameling steel, dried and fired at 1475°F for 3 minutes, as in Example 1. The fired coating is about 2½ mils in thickness, is crack-free, and has a Hoffman scratch hardness of 50 mils. The results of the thermogravimetric activity test shows that 13.2 percent of 106 mg of pork fat applied remains as residue after heating for 24 hours at 450°F. The coating has a surface area of 1.7 m²/g by nitrogen adsorption, and consists of 43.7 percent braunite, 15.1 percent refractory crystalline phase, and 41.2 percent amorphous phase. The appearance of the coating is unaffected by the test.

EXAMPLE 7

A batch of ceramic catalyst clinker is prepared in the same manner as in Example 6 from the following oxides:

|  | Wt. (g) | % |
| --- | --- | --- |
| manganese oxide | 250 | 62.5 |
| nickel oxide | 26 | 6.5 |
| silica | 62 | 15.4 |
| calcium oxide | 17 | 4.25 |
| boron oxide | 20 | 5.0 |
| alumina | 25 | 6.25 |
| Total | 400 | 100.0 |

All the oxides used here are the same as those described in Example 1, except NiO, which is less than 325 mesh, code 1110 supplied by Cerac, Inc., Butler, Wisconsin.

One hundred fifty grams of 370 g recovered after milling and drying the composition in the manner described in Example 6 is fired at 1800°F for 10 minutes. A total of 134 g of the ceramic catalyst clinker, having a Moh's hardness of about 4, is obtained. Analysis shows that the ceramic catalyst clinker contains 62.5 percent braunite, 15.8 percent refractory crystalline phase, and 21.7 percent amorphous binder phase.

The clinker is then ballmilled as described in Example 6, resulting in a ceramic catalyst powder of less than 200 mesh with a surface area of 3.2 m²/g. A catalyst slip is prepared by mixing 50.0 g of the catalyst with 25.3 g of a porcelain enamel slip by blending. The porcelain enamel has a firing range from 1450° to 1475°F, and is prepared from the following composition:

| Frit No. 2244 (Ferro Co.) | 125.0 g |
| --- | --- |
| Frit No. 2255 (Ferro Co.) | 125.0 g |
| Red Label Clay (Ferro Co.) | 10.0 g |
| Clay No. 33 (Ferro Co.) | 7.5 g |
| Quartz (National Glass Sand Co.) | 25.0 g |
| XA-16 $Al_2O_3$ (Alcoa Co.) | 62.5 g |
| No. 8821 Black Oxide (Shepherd Co.) | 5.0 g |
| Bentonite | 0.313 g |
| Borax | 0.313 g |
| Water | 200.0 g |

The frits are micropulverized into −60 mesh powders, which are then placed in a ½-gallon ballmill about half filled with alumina grinding cylinders of about ½ inch dia. × ½ inch high. The rest of the ingredients are then added, water being the last. The mill is tumbled for 3 hours, upon which a slip is recovered having only a trace amount of particles greater than 200 mesh in a 50 g sample. The specific gravity of the enamel slip is then adjusted to 1.60 using a small amount of aqueous trisodium phosphate solution.

The catalyst slip is then sprayed on a steel plate, dried, and the bisque is fired at 1475°F, as in Example 6. The coating prepared thereby is about 2½ mils thick and is free of cracks. It has a hardness of 30 mils by the Hoffman scratch test. In the thermogravimetric activity test as described in Example 1, 18.1 percent residue remains from 127 mg pork fat applied, and no stains are visible on the coating after the test. The surface area of the coating is 1.4 m²/g by nitrogen adsorption, and the coating contains 47.2 percent braunite, 16.5 percent refractory crystalline phase, and 36.3 percent amorphous phase.

EXAMPLE 8

A batch of ceramic catalyst clinker is prepared in the manner similar to Example 6 from the following oxides, which are similar to those used in Example 1:

|  | Wt. (g) | % |
|---|---|---|
| manganese oxide | 300.0 | 75.0 |
| cobalt oxide | 24.0 | 6.0 |
| silica | 44.0 | 11.0 |
| calcium oxide | 8.0 | 2.0 |
| boron oxide | 12.0 | 3.0 |
| alumina | 12.0 | 3.0 |
| Total | 400.0 | 100.0 |

Two hundred grams of 356 g of powder which is recovered after milling and drying is fired at 1800°F for 10 minutes. A total of 186 g of ceramic catalyst clinker, having a Moh's hardness of about 3, is obtained. Analysis shows that the catalyst clinker contains 73.9 percent braunite, 13.7 percent refractory crystalline phase, and 12.4 percent amorphous binder phase.

The clinker is ballmilled as described in Example 6, yielding a ceramic catalyst powder of −200 mesh with a surface area of 4.5 m²/g, which is mixed with a porcelain enamel binder as described in Example 7, thereby preparing a slip. The slip is sprayed on a mild steel plate, dried, and fired as described in Example 7. The resulting porous ceramic coating is about 2½ mils in thickness, and is free of cracks. It has a hardness of 35 mils by the Hoffman scratch test. The pork fat residue as measured by the thermogravimetric method is 10.5 percent of 94 mg pork fat applied. The appearance of the coating is unaffected by the test. The surface area of the coating is 3.6 m²/g by nitrogen adsorption, and it contains 55.4 percent braunite, 14.8 percent refractory crystalline phase, and 29.8 percent amorphous phase.

I claim:
1. A process for preparing a catalytic porcelain coating on an article, said process comprising the following sequential steps:
   a. blending 70–85 parts by weight of a porous, catalytic, fired composition having a Moh's hardness of about 3–6 and a surface area of 0.2–6 m²/g., in powder form,
   said composition consisting essentially of 40–80 weight percent of in-situ formed braunite; 10–50 weight percent of an alkali-free amorphous binder phase composed of a borosilicate glass made in situ from boron oxide, silicon oxide, and at least one of magnesium oxide, calcium oxide, and aluminum oxide with each other, said boron and silicon oxides being present in a weight ratio of $SiO_2:B_2O_3$ from about 1:1 to about 15:1; and 0–20 weight percent of a refractory crystalline phase composed of at least one of magnesium oxide, calcium oxide, strontium oxide, silicon oxide, aluminum oxide, titanium oxide, zirconium oxide, chromium oxide, iron oxide, cobalt oxide, nickel oxide, zinc oxide, and their reaction products with each other
   with 15–30 parts by weight of a porcelain enamel composition having a firing range of 1350°–1500°F. and sufficient water to form a slip with a specific gravity of 1.58–1.62, the total weight being 100 parts of solids;
   b. applying the slip to the article to give one or more finished coatings about 3–5 mils thick;
   c. drying the coating to a bisque at a temperature below about 400°F.;
   d. heating the coating at 1400°–1550°F. for 3–5 minutes; and
   e. cooling to room temperature.
2. The process of claim 1 wherein the temperature range in step (d) is 1400°–1500°F.
3. An article coated by the process of claim 1.
4. The article of claim 3 wherein the coating has a surface area of from 3 m²/g. to 0.2 m²/g.

* * * * *